(12) United States Patent
Choi

(10) Patent No.: US 11,661,114 B2
(45) Date of Patent: May 30, 2023

(54) VEHICLE FLOOR STRUCTURE

(71) Applicants: Kia Motors Corporation, Seoul (KR); Hyundai Motor Company, Seoul (KR)

(72) Inventor: Ji Ho Choi, Hwaseong-si (KR)

(73) Assignees: Hyundai Motor Company, Seoul (KR); Kia Motors Cornoration, Seoul (KR)

( * ) Notice: Subject to any disclaimer, the term of this patent is extended or adjusted under 35 U.S.C. 154(b) by 129 days.

(21) Appl. No.: 17/217,804

(22) Filed: Mar. 30, 2021

(65) Prior Publication Data
US 2022/0081040 A1    Mar. 17, 2022

(30) Foreign Application Priority Data
Sep. 16, 2020  (KR) .................. 10-2020-0119042

(51) Int. Cl.
| | | |
|---|---|---|
| *B62D 25/20* | (2006.01) | |
| *B60K 1/04* | (2019.01) | |
| *B62D 21/03* | (2006.01) | |
| *B60K 15/03* | (2006.01) | |
| *B60K 15/063* | (2006.01) | |

(52) U.S. Cl.
CPC ............ *B62D 25/2009* (2013.01); *B60K 1/04* (2013.01); *B62D 21/03* (2013.01); *B60K 2001/0438* (2013.01); *B60K 2015/03315* (2013.01); *B60K 2015/0635* (2013.01)

(58) Field of Classification Search
CPC .... B60K 2001/0438; B60K 2015/0634; B60K 2015/03315; B62D 25/2009
See application file for complete search history.

(56) References Cited

U.S. PATENT DOCUMENTS

| | | | |
|---|---|---|---|
| 9,499,205 B1* | 11/2016 | Elia .......................... | B60K 6/28 |
| 2006/0027406 A1* | 2/2006 | Borroni-Bird .... | H01M 8/04208 |
| | | | 280/831 |
| 2009/0133948 A1* | 5/2009 | Ijaz ........................ | F17C 13/08 |
| | | | 220/628 |
| 2017/0066479 A1* | 3/2017 | Murata ............. | H01M 8/04201 |
| 2017/0120738 A1* | 5/2017 | Landgraf ............... | B60L 58/40 |
| 2017/0240039 A1* | 8/2017 | Okawachi ............. | B60K 15/07 |
| 2017/0240045 A1* | 8/2017 | Ohashi ..................... | B60K 1/00 |
| 2017/0282709 A1* | 10/2017 | Sasaki .............. | B60K 15/03006 |
| 2018/0022389 A1* | 1/2018 | Kageyama ........... | B62D 21/157 |
| | | | 296/187.08 |
| 2018/0257509 A1* | 9/2018 | Aishima ............. | H01M 8/2465 |
| 2018/0272863 A1* | 9/2018 | Otsura ................... | B62D 25/20 |
| 2018/0326842 A1* | 11/2018 | Sawada ................. | B60K 15/07 |
| 2019/0047633 A1* | 2/2019 | Sawai .............. | B60K 15/03006 |
| 2019/0291573 A1* | 9/2019 | Banno ...................... | B60K 1/04 |
| 2020/0231216 A1* | 7/2020 | Choi .................... | B62D 21/155 |
| 2021/0221436 A1* | 7/2021 | Tsuyuzaki ............ | B62D 25/025 |
| 2021/0268896 A1* | 9/2021 | Ehgartner ............ | B60K 15/063 |

(Continued)

FOREIGN PATENT DOCUMENTS

EP        67651 A   * 12/1982   .......... B60K 15/063

*Primary Examiner* — Jeffrey J Restifo
(74) *Attorney, Agent, or Firm* — Slater Matsil, LLP

(57) ABSTRACT

A vehicle floor structure includes a center floor panel, a tunnel extending along a central longitudinal axis of the center floor panel, and having a tunnel cavity, a hydrogen tank located in the tunnel cavity of the tunnel, and a tank support frame configured to support the hydrogen tank so that the hydrogen tank is held in the tunnel cavity.

18 Claims, 8 Drawing Sheets

(56) References Cited

U.S. PATENT DOCUMENTS

| | | | | |
|---|---|---|---|---|
| 2021/0300473 A1* | 9/2021 | Kohara | .................... | B60K 5/02 |
| 2021/0300480 A1* | 9/2021 | Kohara | .................... | B60K 1/04 |
| 2022/0081040 A1* | 3/2022 | Choi | ........................ | B60K 1/04 |
| 2022/0097516 A1* | 3/2022 | Iijima | ..................... | B60L 50/71 |
| 2022/0105991 A1* | 4/2022 | Kim | ..................... | B60K 15/063 |
| 2022/0306207 A1* | 9/2022 | Katayama | ............ | B62D 21/157 |

* cited by examiner

VEHICLE FLOOR STRUCTURE

CROSS-REFERENCE TO RELATED APPLICATIONS

This application claims the benefit of Korean Patent Application No. 10-2020-0119042, filed in the Korean Intellectual Property Office on Sep. 16, 2020, which application is hereby incorporated herein by reference.

TECHNICAL FIELD

The present disclosure relates to a vehicle floor structure.

BACKGROUND

In recent years, as the perception of environmental crisis and depletion of oil resources has increased, research and development of eco-friendly electric vehicles have actively been conducted. Electric vehicles include plug-in hybrid electric vehicles (PHEVs), battery electric vehicles (BEVs), fuel cell electric vehicles (FCEVs), etc.

FCEVs include a fuel cell stack generating electricity using hydrogen, a hydrogen tank storing hydrogen, and a battery pack storing electrical energy generated by regenerative braking.

In existing FCEVs, as the hydrogen tank and the battery pack are disposed under a rear floor panel of a vehicle body, a luggage space of the vehicle may be narrowed, and it may be difficult or impossible to install rear seats.

The overall weight of the FCEV may be increased due to the hydrogen tank and the battery pack, compared to a weight of an internal combustion engine vehicle. In order to improve the strength, stiffness, NVH performance, etc. of the vehicle body, the FCEV may have a plurality of reinforcing members mounted in a tunnel portion of the vehicle body, making an assembly process relatively complex, and increasing the manufacturing cost.

The above information described in this background section is provided to assist in understanding the background of the inventive concept, and may include any technical concept which is not considered as the prior art that is already known to those skilled in the art.

SUMMARY

The present disclosure relates to a vehicle floor structure. Particular embodiments relate to a vehicle floor structure allowing a hydrogen tank and a battery pack to be mounted under a center floor.

Embodiments of the present disclosure can solve problems occurring in the prior art while advantages achieved by the prior art are maintained intact.

An embodiment of the present disclosure provides a vehicle floor structure allowing a hydrogen tank and a battery pack to be mounted under a center floor of a vehicle body, thereby securing a luggage space.

According to an embodiment of the present disclosure, a vehicle floor structure may include a center floor panel, a tunnel extending along a central longitudinal axis of the center floor panel, and having a tunnel cavity, a hydrogen tank located in the tunnel cavity of the tunnel, and a tank support frame supporting the hydrogen tank so that the hydrogen tank may be held in the tunnel cavity.

The vehicle floor structure may further include a pair of first lower crossmembers attached to a bottom surface of the center floor panel, being symmetrical to each other with respect to the tunnel, and being adjacent to the front of the tunnel, a pair of second lower crossmembers attached to the bottom surface of the center floor panel, being symmetrical to each other with respect to the tunnel, and being adjacent to the rear of the tunnel, and a pair of lower longitudinal members attached to the bottom surface of the center floor panel, and disposed on both edges of the tunnel, respectively.

The tank support frame may include a plurality of tank-side transversal members extending in a width direction of the hydrogen tank, and a tank-side longitudinal member extending in a longitudinal direction of the hydrogen tank, and the plurality of tank-side transversal members may extend in a width direction of the tunnel to connect the pair of lower longitudinal members.

At least one tank-side transversal member among the plurality of tank-side transversal members may be aligned with and connected to the pair of first lower crossmembers along a width direction of the vehicle.

The pair of first lower crossmembers, the pair of second lower crossmembers, and the pair of lower longitudinal members may define a pair of cavities, and the pair of cavities may be symmetrical to each other with respect to the tunnel.

The vehicle floor structure may further include a battery pack mounted in at least one cavity of the pair of cavities.

The battery pack may be supported by a battery support frame so that the battery pack may be held in the cavity.

The battery support frame may include a plurality of battery-side transversal members extending in a width direction of the battery pack.

At least one battery-side transversal member among the plurality of battery-side transversal members may be aligned with and connected to at least one tank-side transversal member among the plurality of tank-side transversal members along the width direction of the vehicle.

The battery-side transversal member and the tank-side transversal member may be connected to one of the pair of lower longitudinal members by a fastener.

The vehicle floor structure may further include a third lower crossmember disposed in at least one cavity of the pair of cavities, and the third lower crossmember may extend in the width direction of the vehicle.

The battery-side transversal member and the tank-side transversal member may be aligned with and connected to the third lower crossmember along the width direction of the vehicle.

The vehicle floor structure may further include a battery pack mounted in one cavity of the pair of cavities, and an electronic component device mounted in the other cavity of the pair of cavities.

The vehicle floor structure may further include a pair of battery packs mounted in the pair of cavities, respectively.

The vehicle floor structure may further include a pair of first seat crossmembers attached to a top surface of the center floor panel, and a pair of second seat crossmembers attached to the top surface of the center floor panel, and located behind the pair of first seat crossmembers. The pair of first lower crossmembers may be vertically aligned with the pair of first seat crossmembers.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
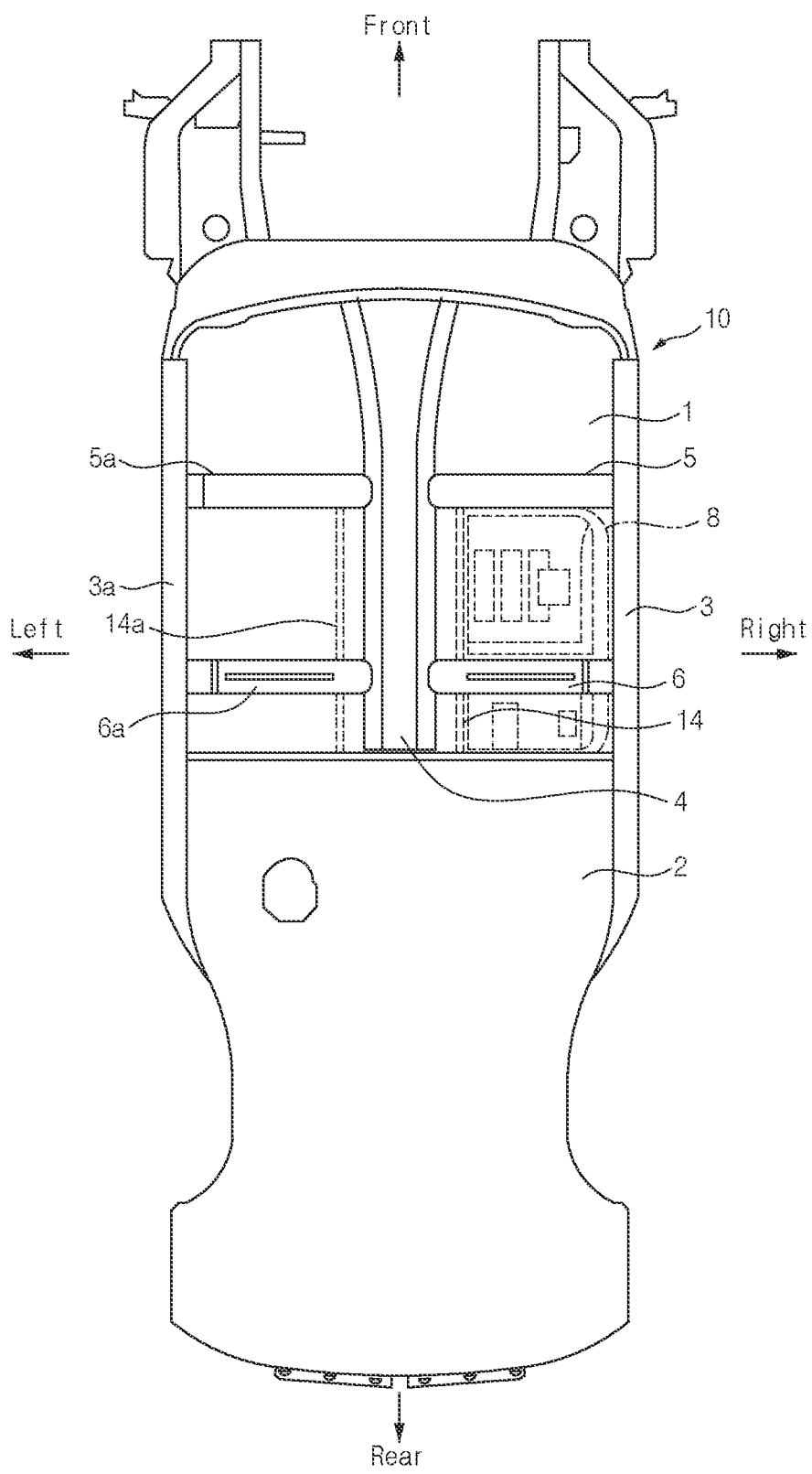
FIG. 1 illustrates a plan view of a vehicle floor structure according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
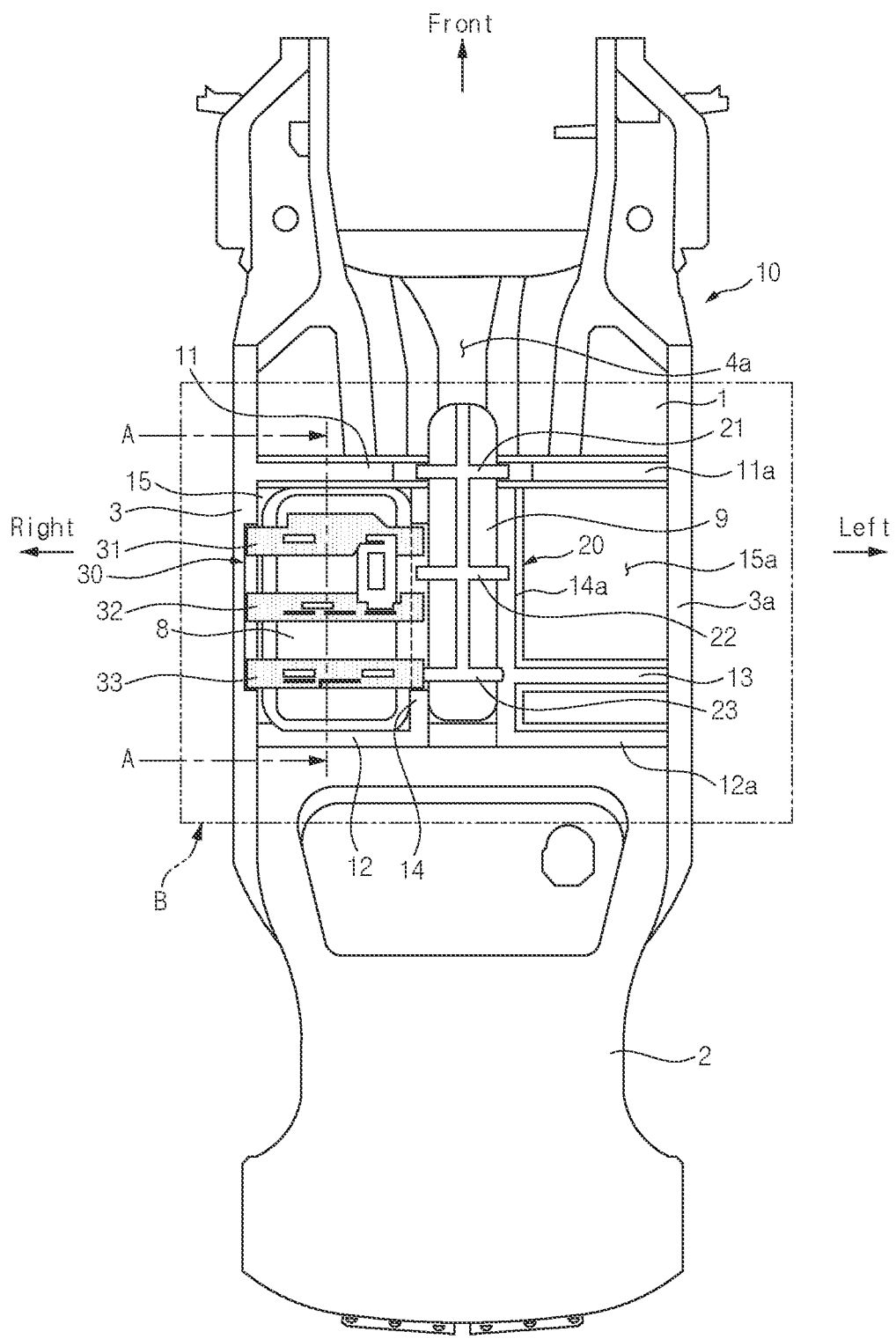
FIG. 2 illustrates a bottom view of a vehicle floor structure according to an exemplary embodiment of the present disclosure.

Referring to FIGS. 1 and 2, a vehicle floor structure 10 according to an exemplary embodiment of the present disclosure may include a center floor panel 1 disposed on the bottom of a vehicle body, and a rear floor panel 2 connected to the rear of the center floor panel 1.

The center floor panel 1 and the rear floor panel 2 may be disposed on the bottom of the vehicle body to form a floor of the vehicle body. A tunnel 4 may extend along a central longitudinal axis of the center floor panel 1. As the tunnel 4 is raised upwardly from the center floor panel 1, the tunnel 4 may have a tunnel cavity 4a. The tunnel cavity 4a may be open to the bottom of the vehicle, and a hydrogen tank 9 may be located in the tunnel cavity 4a. The hydrogen tank 9 may have a cylindrical shape extending in a longitudinal direction of the vehicle.

Figure 4:
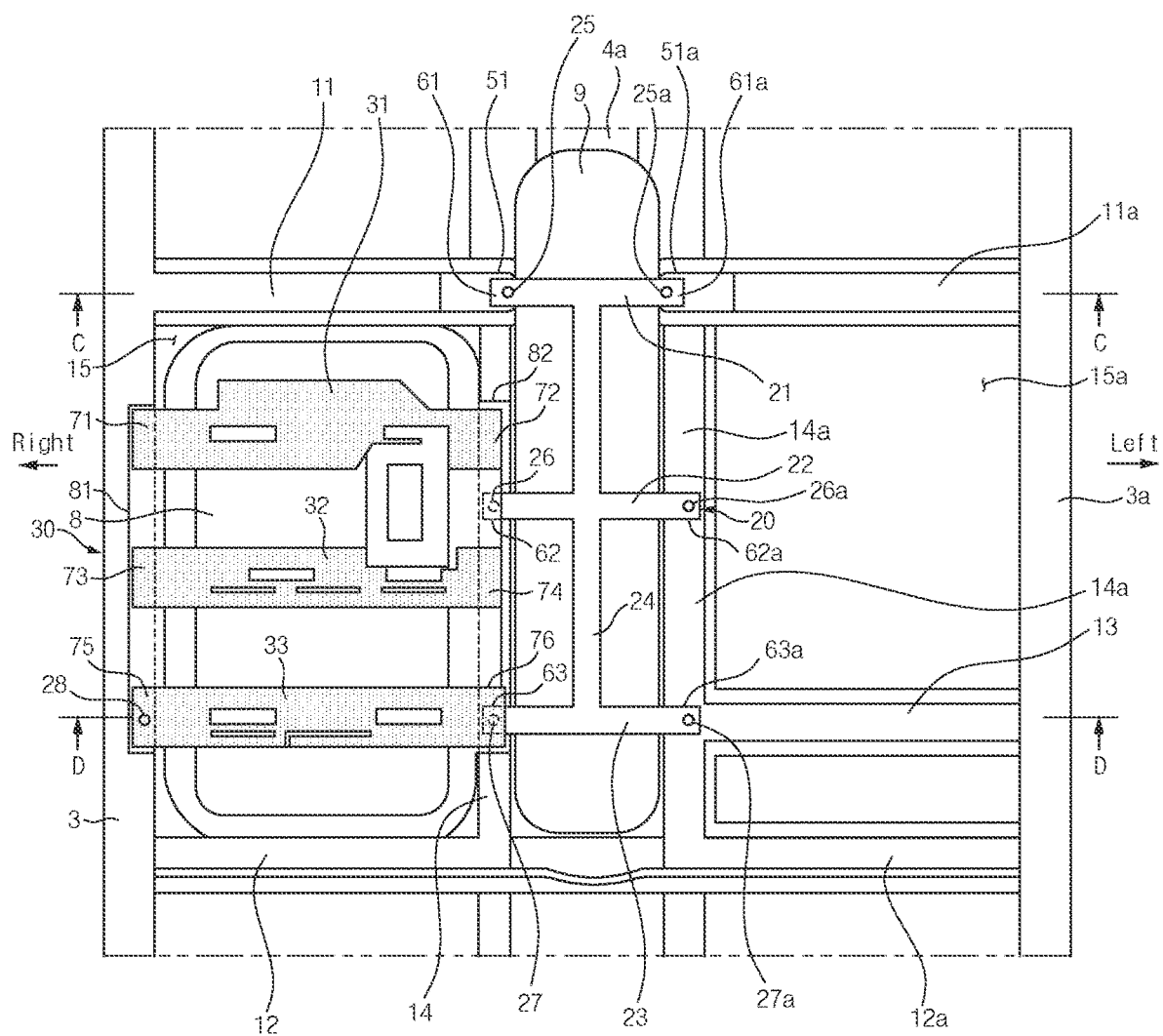
FIG. 4 illustrates an enlarged view of portion B of FIG. 2.
Figure 5:
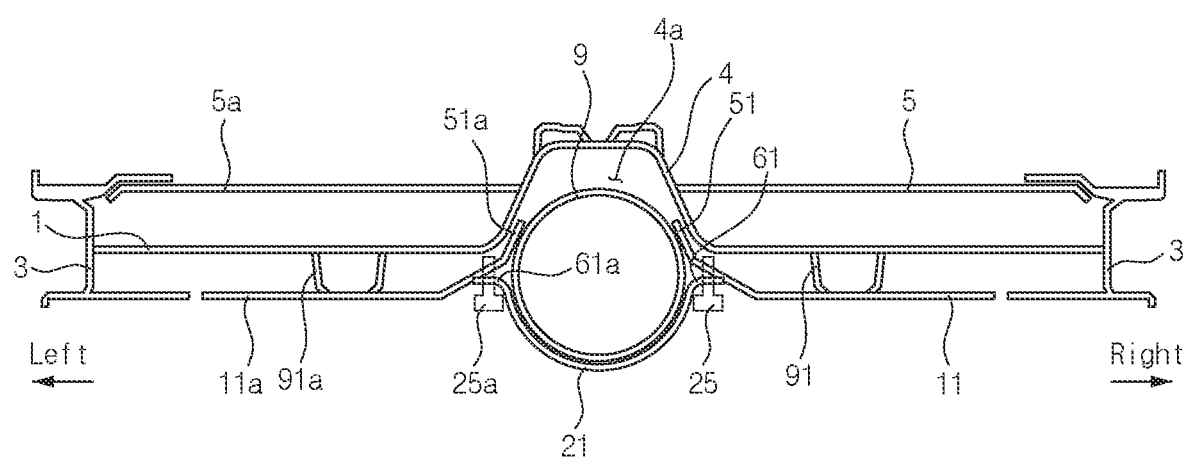
FIG. 5 illustrates a cross-sectional view, taken along line C-C of FIG. 4.
Figure 6:
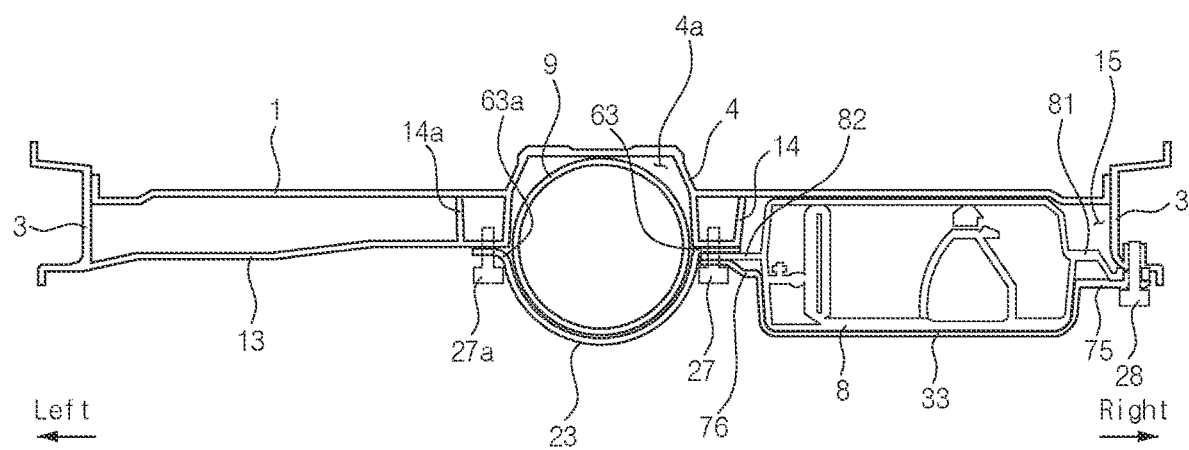
FIG. 6 illustrates a cross-sectional view, taken along line D-D of FIG. 4.

Referring to FIGS. 4 to 6, the hydrogen tank 9 may be supported by a tank support frame 20 so that the hydrogen tank 9 may be held in the tunnel cavity 4a. The tank support frame 20 may include a plurality of tank-side transversal members 21, 22, and 23 extending in a width direction of the hydrogen tank 9 and a width direction of the vehicle, and a tank-side longitudinal member 24 extending in a longitudinal direction of the hydrogen tank 9 and the longitudinal direction of the vehicle.

The plurality of tank-side transversal members 21, 22, and 23 may include a first tank-side transversal member 21 adjacent to a front end of the hydrogen tank 9, a second tank-side transversal member 22 located behind the first tank-side transversal member 21, and a third tank-side transversal member 23 located behind the second tank-side transversal member 22. For example, the first tank-side transversal member 21, the second tank-side transversal member 22, and the third tank-side transversal member 23 may have a semicircular shape and extend to stably support a bottom surface of the hydrogen tank 9. The tank-side longitudinal member 24 may connect the first tank-side transversal member 21, the second tank-side transversal member 22, and the third tank-side transversal member 23.

A pair of side sills 3 and 3a may be connected to both edges of the center floor panel 1 and both edges of the rear floor panel 2. Each of the side sills 3 and 3a may extend in the longitudinal direction of the vehicle.

A plurality of seat crossmembers 5, 5a, 6, and 6a may be attached to a top surface of the center floor panel 1 by using fasteners, welding, and/or the like. Vehicle seats may be mounted on the plurality of seat crossmembers 5, 5a, 6, and 6a. Referring to FIG. 1, the plurality of seat crossmembers 5, 5a, 6, and 6a may be symmetrically arranged on both sides of the tunnel 4. For example, the plurality of seat crossmembers 5, 5a, 6, and 6a may include a pair of first seat crossmembers 5 and 5a and a pair of second seat crossmembers 6 and 6a. The pair of first seat crossmembers 5 and 5a may be adjacent to a front end of the center floor panel 1, and the pair of second seat crossmembers 6 and 6a may be adjacent to a rear end of the center floor panel 1. That is, the pair of second seat crossmembers 6 and 6a may be located behind the pair of first seat crossmembers 5 and 5a. Each of the seat crossmembers 5, 5a, 6, and 6a may extend in the width direction of the vehicle, and the seat crossmembers 5, 5a, 6, and 6a may be connected to both corresponding edges of the tunnel 4.

Figure 3:
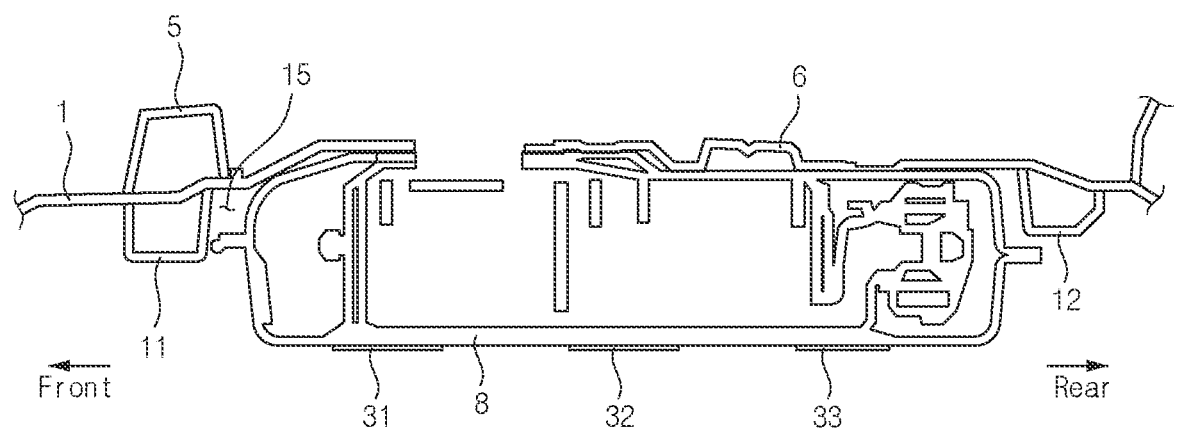
FIG. 3 illustrates a cross-sectional view, taken along line A-A of FIG. 2.

Referring to FIGS. 2 and 3, a plurality of lower crossmembers 11, 11a, 12, and 12a and a pair of lower longitudinal members 14 and 14a may be attached to a bottom surface of the center floor panel 1 by using fasteners, welding, and/or the like.

The plurality of lower crossmembers 11, 11a, 12, and 12a may include a pair of first lower crossmembers 11 and 11a adjacent to the front of the tunnel 4, and a pair of second lower crossmembers 12 and 12a adjacent to the rear of the tunnel 4.

The pair of first lower crossmembers 11 and 11a may be symmetrical to each other with respect to the tunnel 4, and each of the first lower crossmembers 11 and 11a may extend in the width direction of the vehicle. The first lower crossmembers 11 and 11a may extend from the corresponding edges of the tunnel 4 to the corresponding side sills 3 and 3a, respectively. Specifically, the right first lower crossmember 11 may extend from the right edge of the tunnel 4 to the right side sill 3, and the left first lower crossmember 11a may extend from the left edge of the tunnel 4 to the left side sill 3a. The pair of first lower crossmembers 11 and 11a may be vertically aligned with respect to the pair of first seat crossmembers 5 and 5a. Referring to FIG. 5, the first lower crossmembers 11 and 11a may be vertically aligned with the first seat crossmembers 5 and 5a, respectively. Specifically, the right first lower crossmember 11 may be aligned with the right first seat crossmember 5 in the vertical direction, and the left first lower crossmember 11a may be aligned with the left first seat crossmember 5a in the vertical direction.

The pair of second lower crossmembers 12 and 12a may be symmetrical to each other with respect to the tunnel 4, and each of the second lower crossmembers 12 and 12a may extend in the width direction of the vehicle. The second lower crossmembers 12 and 12a may extend from the corresponding edges of the tunnel 4 to the corresponding side sills 3 and 3a, respectively. Specifically, the right second lower crossmember 12 may extend from the right edge of the tunnel 4 to the right side sill 3, and the left second lower crossmember 12a may extend from the left edge of the tunnel 4 to the left side sill 3a.

The pair of lower longitudinal members 14 and 14a may be disposed on both edges of the tunnel 4, respectively, and the pair of lower longitudinal members 14 and 14a may be symmetrical to each other with respect to the tunnel 4. Each of the lower longitudinal members 14 and 14a may extend in the longitudinal direction of the vehicle and a longitudinal direction of the tunnel 4.

The pair of first lower crossmembers 11 and 11a, the pair of second lower crossmembers 12 and 12a, the pair of side sills 3 and 3a, and the pair of lower longitudinal members 14 and 14a may define a pair of cavities 15 and 15a, and the pair of cavities 15 and 15a may be symmetrically formed on both left and right sides of the tunnel 4. For example, the right first lower crossmember 11, the right second lower crossmember 12, the right side sill 3, and the right lower longitudinal member 14 may define the right cavity 15, and the left first lower crossmember 11a, the left second lower crossmember 12a, the left side sill 3a, and the left lower longitudinal member 14a may define the left cavity 15a.

The pair of lower longitudinal members 14 and 14a may be attached to both edges of the tunnel 4, and the plurality of tank-side transversal members 21, 22, and 23 may extend transversely under the tunnel 4 to connect the pair of lower longitudinal members 14 and 14a, thereby ensuring stiffness of the tunnel 4.

A battery pack 8 may be mounted in the right cavity 15 or the left cavity 15a. The battery pack 8 may have a pair of mounting flanges 81 and 82 opposing each other, and the pair of mounting flanges 81 and 82 may be disposed on both edges of the battery pack 8, respectively. For example, as illustrated in FIGS. 2 to 4, the battery pack 8 may be mounted in the right cavity 15, and the battery pack 8 may have the mounting flange 81 connected to the right side sill 3, and the mounting flange 82 connected to the right lower longitudinal member 14. The top of the battery pack 8 may be received in the right cavity 15, and the battery pack 8 may be supported by a battery support frame 30 so that the battery pack 8 may be held in the right cavity 15.

The battery support frame 30 may include a plurality of battery-side transversal members 31, 32, and 33 extending in a width direction of the battery pack 8 and the width direction of the vehicle. The plurality of battery-side transversal members 31, 32, and 33 may include a first battery-side transversal member 31 adjacent to a front end of the battery pack 8, a second battery-side transversal member 32 located behind the first battery-side transversal member 31, and a third battery-side transversal member 33 located behind the second battery-side transversal member 32.

Referring to FIG. 4, the first battery-side transversal member 31 may have a pair of flanges 71 and 72 on both ends thereof, respectively. Specifically, the first battery-side transversal member 31 may have the flange 71 connected to the right side sill 3 and the flange 72 connected to the right lower longitudinal member 14. The flange 71 of the first battery-side transversal member 31 and the mounting flange 81 of the battery pack 8 may be connected to the right side sill 3 by using fasteners, welding, and/or the like, and the flange 72 of the first battery-side transversal member 31 and the mounting flange 82 of the battery pack 8 may be connected to the right lower longitudinal member 14 by using fasteners, welding, and/or the like.

Referring to FIG. 4, the second battery-side transversal member 32 may have a pair of flanges 73 and 74 on both ends thereof, respectively. Specifically, the second battery-side transversal member 32 may have the flange 73 connected to the right side sill 3 and the flange 74 connected to the right lower longitudinal member 14. The flange 73 of the second battery-side transversal member 32 and the mounting flange 81 of the battery pack 8 may be connected to the right side sill 3 by using fasteners, welding, and/or the like, and the flange 74 of the second battery-side transversal member 32 and the mounting flange 82 of the battery pack 8 may be connected to the right lower longitudinal member 14 by using fasteners, welding, and/or the like.

Referring to FIGS. 4 and 6, the third battery-side transversal member 33 may have a pair of flanges 75 and 76 on both ends thereof, respectively. Specifically, the third battery-side transversal member 33 may have the flange 75 connected to the right side sill 3 and the flange 76 connected to the right lower longitudinal member 14. The flange 75 of the third battery-side transversal member 33 and the mounting flange 81 of the battery pack 8 may be connected to the right side sill 3 by a fastener 28, and the flange 76 of the third battery-side transversal member 33 and the mounting flange 82 of the battery pack 8 may be connected to the right lower longitudinal member 14 by a fastener 27.

At least one tank-side transversal member 21 of the tank support frame 20 may be aligned with and connected to at least one pair of lower crossmembers 11 and 11a among the plurality of lower crossmembers along the width direction of the vehicle, and at least one tank-side transversal member 23 of the tank support frame 20 may be aligned with and connected to at least one battery-side transversal member 33 of the battery support frame 30.

Referring to FIGS. 4 and 5, the first tank-side transversal member 21 may be aligned with the first lower crossmembers 11 and 11a. The first tank-side transversal member 21 may have a pair of flanges 61 and 61a on both ends thereof, respectively. Specifically, the first tank-side transversal member 21 may have the right flange 61 extending toward the right side sill 3 and the left flange 61a extending toward the left side sill 3a. The first lower crossmembers 11 and 11a may have a pair of flanges 51 and 51a on both ends thereof, respectively. Specifically, the first lower crossmembers 11 and 11a may have the pair of flanges 51 and 51a overlapping the pair of flanges 61 and 61a of the first tank-side transversal member 21, respectively. Specifically, the right first lower crossmember 11 may have the flange 51 overlapping the right flange 61 of the first tank-side transversal member 21, and the left first lower crossmember 11a may have the flange 51a overlapping the left flange 61a of the first tank-side transversal member 21. The flanges 61 and 61a of the first tank-side transversal member 21 may be connected to the flanges 51 and 51a of the first lower crossmembers 11 and 11a by fasteners 25 and 25a, respectively. Specifically, the right flange 61 of the first tank-side transversal member 21 may be connected to the flange 51 of the right first lower crossmember 11 by the right fastener 25, and the left flange 61a of the first tank-side transversal member 21 may be connected to the flange 51a of the left first lower crossmember 11a by the left fastener 25a.

Referring to FIG. 4, the second tank-side transversal member 22 may have a pair of flanges 62 and 62a on both ends thereof, respectively. Specifically, the second tank-side transversal member 22 may have the pair of flanges 62 and 62a connected to the pair of lower longitudinal members 14 and 14a, respectively. Specifically, the second tank-side transversal member 22 may have the right flange 62 extending toward the right side sill 3 and the left flange 62a extending toward the left side sill 3a. The flanges 62 and 62a of the second tank-side transversal member 22 may be connected to the corresponding lower longitudinal members 14 and 14a by fasteners 26 and 26a, respectively. Specifically, the right flange 62 of the second tank-side transversal member 22 may be connected to the right lower longitudinal member 14 together with the left mounting flange 82 of the battery pack 8 by the right fastener 26, and the left flange 62a of the second tank-side transversal member 22 may be connected to the left lower longitudinal member 14a by the left fastener 26a.

Referring to FIGS. 4 and 6, the third tank-side transversal member 23 may have a pair of flanges 63 and 63a connected to the pair of lower longitudinal members 14 and 14a, respectively. Specifically, the third tank-side transversal member 23 may have the right flange 63 extending toward the right side sill 3 and the left flange 63a extending toward the left side sill 3a. The flanges 63 and 63a of the third tank-side transversal member 23 may be connected to the corresponding lower longitudinal members 14 and 14a by fasteners 27 and 27a, respectively. Specifically, the right flange 63 of the third tank-side transversal member 23, the left mounting flange 82 of the battery pack 8, and the left flange 76 of the third battery-side transversal member 33 may be connected to the right lower longitudinal member 14 by the right fastener 27 so that the mounting stiffness of the third tank-side transversal member 23, the mounting stiffness of the battery pack 8, and the mounting stiffness of the third battery-side transversal member 33 may be increased, and the left flange 63a of the third tank-side transversal member 23 may be connected to the left lower longitudinal member 14a by the left fastener 27a.

As the first tank-side transversal member 21 is aligned with and connected to the first lower crossmembers 11 and 11a, and the third tank-side transversal member 23 is aligned with and connected to the third battery-side transversal member 33, the tank support frame 20 and the battery support frame 30 may be connected to the lower crossmembers 11, 11a, 12, and 12a, and thus a load generated in a side impact/collision of the vehicle may be evenly distributed and transferred in the width direction of the vehicle.

According to an exemplary embodiment of the present disclosure, a third lower crossmember 13 may be attached to at least one cavity of the pair of cavities 15 and 15a, and the third lower crossmember 13 may extend in the width direction of the vehicle.

Figure 7:
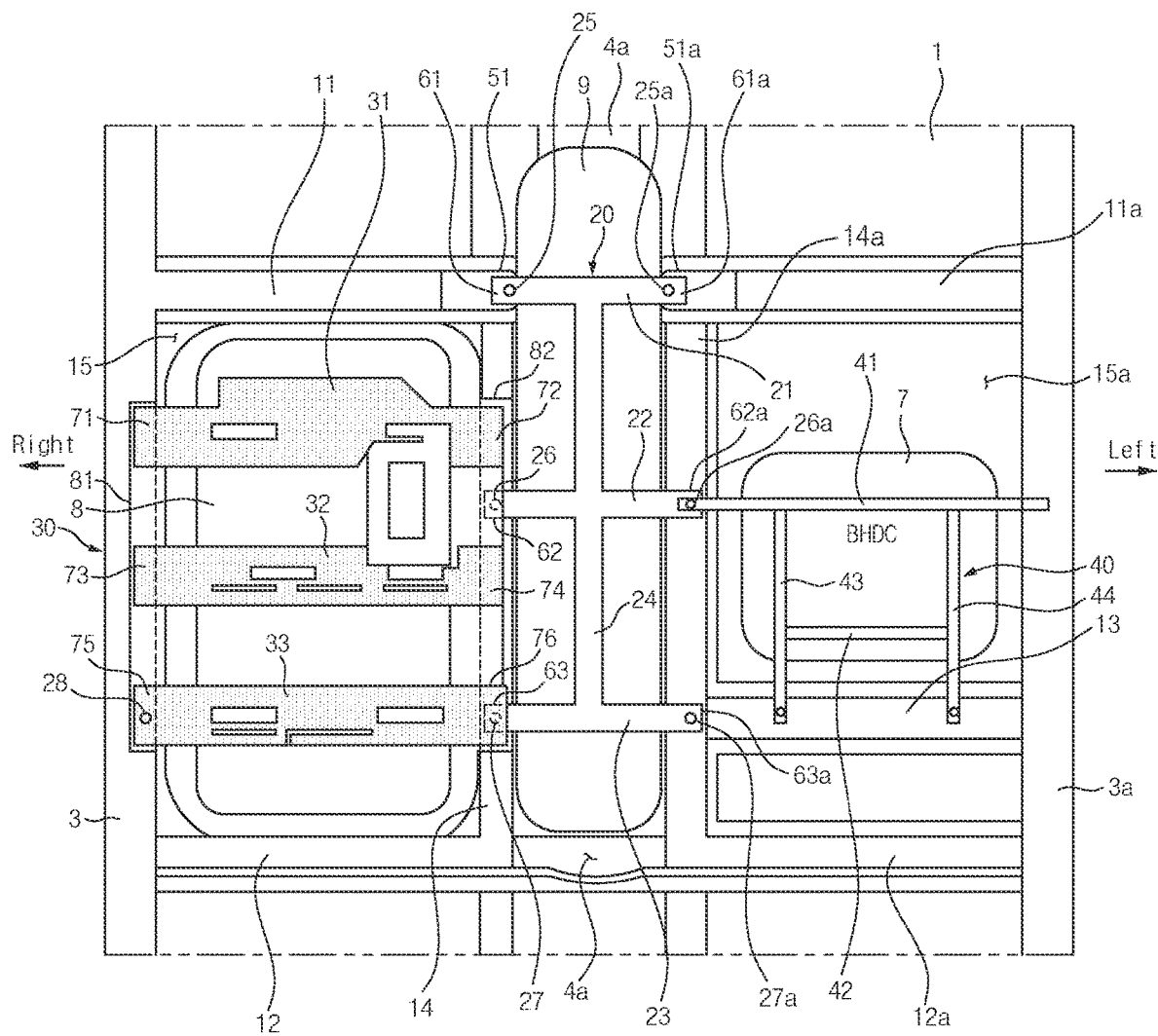
FIG. 7 illustrates a bottom view of a vehicle floor structure according to another exemplary embodiment of the present disclosure.

According to a specific exemplary embodiment, the battery pack 8 may be mounted in one cavity 15 of the pair of cavities 15 and 15a, and an electronic component device 7 such as a fuel cell controller and a bi-directional high-voltage DC-DC converter (BHDC) may be mounted in the other cavity 15a of the pair of cavities 15 and 15a. Referring to FIG. 7, the battery pack 8 may be mounted in the right cavity 15, and the electronic component device 7 may be mounted in the left cavity 15a. Since the weight and size of the electronic component device 7 are less than those of the battery pack 8, the third lower crossmember 13 may be attached to the left cavity 15a for balance between the left and right sides of the tunnel 4, and the third lower crossmember 13 may extend from the left longitudinal member 14a to the left side sill 3a.

The electronic component device 7 may be supported by a device-side support frame 40 so that the electronic component device 7 may be held in the left cavity 15a. The device-side support frame 40 may include a plurality of device-side transversal members 41 and 42 extending in the width direction of the vehicle, and a plurality of device-side longitudinal members 43 and 44 extending in the longitudinal direction of the vehicle. Specifically, the plurality of device-side transversal members 41 and 42 may include a first device-side transversal member 41 extending in the width direction of the vehicle, and a second device-side transversal member 42 located behind the first device-side transversal member 41. The plurality of device-side longitudinal members 43 and 44 may include a first device-side longitudinal member 43 adjacent to the left lower longitudinal member 14a, and a second device-side longitudinal member 44 adjacent to the left side sill 3a. The first device-side longitudinal member 43 and the second device-side longitudinal member 44 may connect the first device-side transversal member 41 to the third lower crossmember 13, and the second device-side transversal member 42 may connect the first device-side longitudinal member 43 to the second device-side longitudinal member 44.

At least one device-side transversal member 41 of the device-side support frame 40 may be aligned with and connected to at least one tank-side transversal member 22 of the tank support frame 20. Specifically, a right end of the first device-side transversal member 41 may be connected to the left flange 62a of the second tank-side transversal member 22 and the left lower longitudinal member 14a by the fastener 26a.

The device-side support frame 40 may be connected to the tank support frame 20 and the third lower crossmember 13, and thus a load generated in a side impact/collision of the vehicle may be evenly distributed and transferred in the width direction of the vehicle.

Figure 8:
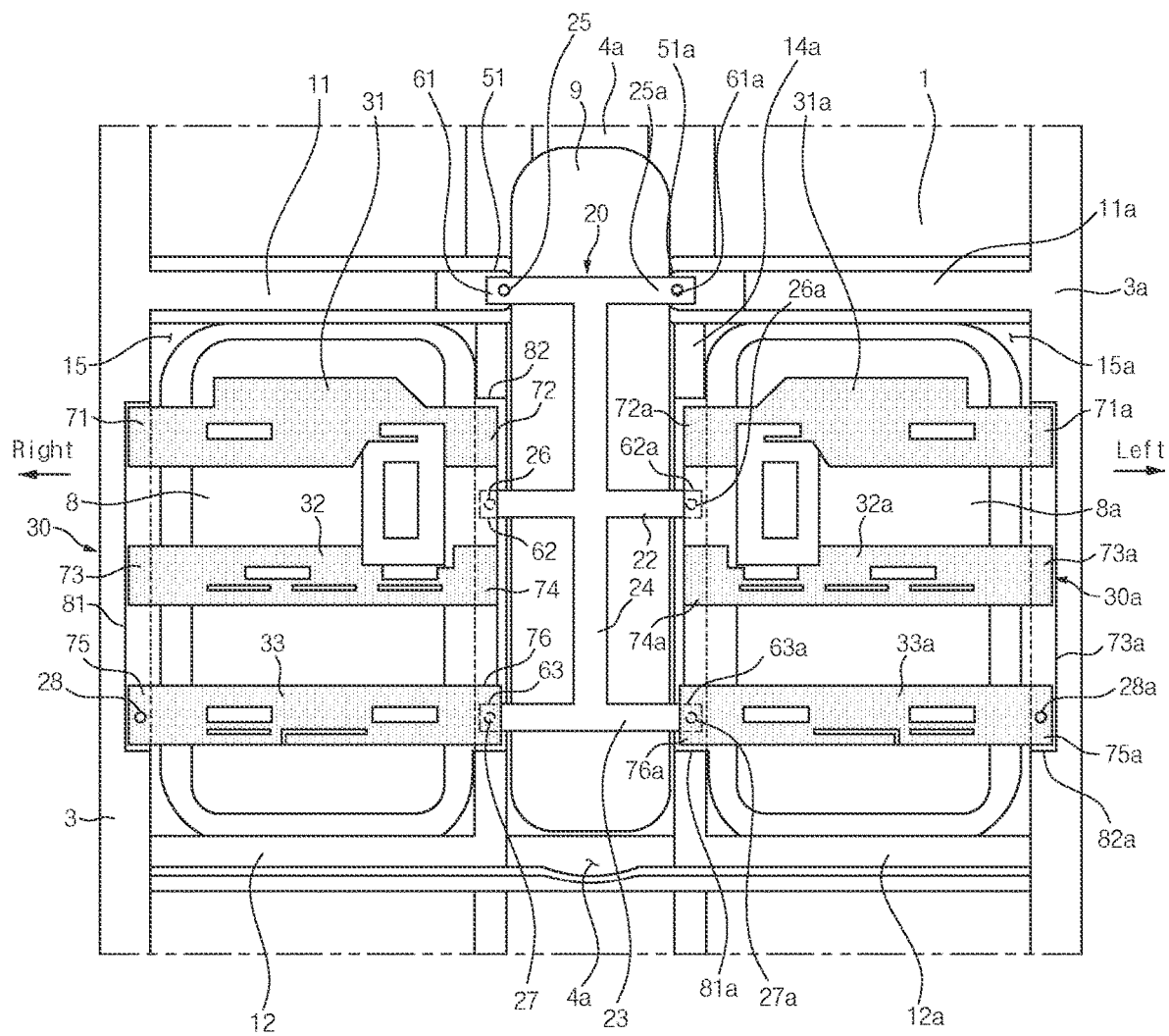
FIG. 8 illustrates a bottom view of a vehicle floor structure according to another exemplary embodiment of the present disclosure.

Referring to FIG. 8, two battery packs 8 and 8a may be mounted in the right cavity 15 and the left cavity 15a, respectively.

Like the structure illustrated in FIG. 4, the right battery pack 8 may be supported by the right battery support frame 30 so that the right battery pack 8 may be held in the right cavity 15. Since the configurations of the right battery pack 8 and the right battery support frame 30 supporting the right battery pack 8 are the same as those described above with reference to FIG. 4, a detailed description thereof will be omitted.

The left battery pack 8a may be supported by a left battery support frame 30a so that the left battery pack 8a may be held in the left cavity 15a. The left battery pack 8a may have a mounting flange 81a connected to the left lower longitudinal member 14a, and a mounting flange 82a connected to the left side sill 3a.

The left battery support frame 30a may include a plurality of battery-side transversal members 31a, 32a, and 33a extending in the width direction of the left battery pack 8a and the width direction of the vehicle. The plurality of battery-side transversal members 31a, 32a, and 33a may include a first battery-side transversal member 31a adjacent to a front end of the left battery pack 8a, a second battery-side transversal member 32a located behind the first battery-side transversal member 31*a*, and a third battery-side transversal member 33*a* located behind the second battery-side transversal member 32*a*.

The first battery-side transversal member 31*a* may have a pair of flanges 71*a* and 72*a* on both ends thereof, respectively. Specifically, the first battery-side transversal member 31*a* may have the flange 71*a* connected to the left side sill 3*a* and the flange 72*a* connected to the left lower longitudinal member 14*a*. The flange 71*a* of the first battery-side transversal member 31*a* and the mounting flange 82*a* of the left battery pack 8*a* may be connected to the left side sill 3*a* by using fasteners, welding, and/or the like, and the flange 72*a* of the first battery-side transversal member 31 and the mounting flange 81*a* of the left battery pack 8*a* may be connected to the left lower longitudinal member 14*a* by using fasteners, welding, and/or the like.

The second battery-side transversal member 32*a* may have a pair of flanges 73*a* and 74*a* on both ends thereof, respectively. Specifically, the second battery-side transversal member 32*a* may have the flange 73*a* connected to the left side sill 3*a* and the flange 74*a* connected to the left lower longitudinal member 14*a*. The flange 73*a* of the second battery-side transversal member 32*a* and the mounting flange 82*a* of the left battery pack 8*a* may be connected to the left side sill 3*a* by using fasteners, welding, and/or the like, and the flange 74*a* of the second battery-side transversal member 32*a* and the mounting flange 81*a* of the left battery pack 8*a* may be connected to the left lower longitudinal member 14*a* by using fasteners, welding, and/or the like.

The third battery-side transversal member 33*a* may have a pair of flanges 75*a* and 76*a* on both ends thereof, respectively. Specifically, the third battery-side transversal member 33*a* may have the flange 75*a* connected to the left side sill 3*a* and the flange 76*a* connected to the left lower longitudinal member 14*a*. The flange 75*a* of the third battery-side transversal member 33*a* and the mounting flange 82*a* of the left battery pack 8*a* may be connected to the left side sill 3*a* by a fastener 28*a*. The left flange 63*a* of the third tank-side transversal member 23, the flange 76*a* of the third battery-side transversal member 33*a*, and the mounting flange 81*a* of the left battery pack 8*a* may be connected to the left lower longitudinal member 14*a* by the fastener 27*a*. Thus, the mounting stiffness of the third tank-side transversal member 23, the mounting stiffness of the third battery-side transversal member 33*a*, and the mounting stiffness of the left battery pack 8*a* may be increased.

As set forth above, according to exemplary embodiments of the present disclosure, the hydrogen tank and the battery pack may be disposed under the center floor panel of the vehicle body so that a luggage space of the vehicle may be secured, and mounting spaces for rear seats may be secured.

According to exemplary embodiments of the present disclosure, the hydrogen tank may be disposed in the tunnel and the battery pack may be disposed under the center floor panel so that the hydrogen tank and the battery pack may be safely protected.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle floor structure, comprising:
    a center floor panel;
    a tunnel extending along a central longitudinal axis of the center floor panel, and having a tunnel cavity;
    a hydrogen tank located in the tunnel cavity of the tunnel;
    a tank support frame configured to support the hydrogen tank so that the hydrogen tank is held in the tunnel cavity; and
    a pair of lower longitudinal members attached to a bottom surface of the center floor panel, and disposed on both edges of the tunnel, respectively;
    wherein the tank support frame includes a plurality of tank-side transversal members extending in a width direction of the hydrogen tank, and a tank-side longitudinal member extending in a longitudinal direction of the hydrogen tank; and
    wherein the plurality of tank-side transversal members extend in a width direction of the tunnel to connect the pair of lower longitudinal members.

2. The vehicle floor structure according to claim 1, further comprising:
    a pair of first lower crossmembers attached to the bottom surface of the center floor panel, being symmetrical to each other with respect to the tunnel, and being adjacent to a front of the tunnel; and
    a pair of second lower crossmembers attached to the bottom surface of the center floor panel, being symmetrical to each other with respect to the tunnel, and being adjacent to a rear of the tunnel.

3. The vehicle floor structure according to claim 2, wherein at least one tank-side transversal member among the plurality of tank-side transversal members is aligned with and connected to the pair of first lower crossmembers along a width direction of a vehicle.

4. The vehicle floor structure according to claim 2, further comprising:
    a pair of first seat crossmembers attached to a top surface of the center floor panel; and
    a pair of second seat crossmembers attached to the top surface of the center floor panel, and located behind the pair of first seat crossmembers,
    wherein the pair of first lower crossmembers are vertically aligned with the pair of first seat crossmembers.

5. A vehicle floor structure, comprising:
    a center floor panel;
    a tunnel extending along a central longitudinal axis of the center floor panel, and having a tunnel cavity;
    a pair of first lower crossmembers attached to a bottom surface of the center floor panel, being symmetrical to each other with respect to the tunnel, and being adjacent to a front of the tunnel;
    a pair of second lower crossmembers attached to the bottom surface of the center floor panel, being symmetrical to each other with respect to the tunnel, and being adjacent to a rear of the tunnel; and
    a pair of lower longitudinal members attached to the bottom surface of the center floor panel, and disposed on both edges of the tunnel, respectively;
    a hydrogen tank located in the tunnel cavity of the tunnel;
    a tank support frame configured to support the hydrogen tank so that the hydrogen tank is held in the tunnel cavity, wherein the tank support frame comprises:
        a plurality of tank-side transversal members extending in a width direction of the hydrogen tank and extending in a width direction of the tunnel to connect the pair of lower longitudinal members, wherein at least one tank-side transversal member among the plurality of tank-side transversal members is aligned with and connected to the pair of first lower crossmembers along a width direction of a vehicle; and a tank-side longitudinal member extending in a longitudinal direction of the hydrogen tank;

wherein the pair of first lower crossmembers, the pair of second lower crossmembers, and the pair of lower longitudinal members define a pair of cavities; and wherein the pair of cavities are symmetrical to each other with respect to the tunnel.

6. The vehicle floor structure according to claim 5, further comprising a battery pack mounted in at least one cavity of the pair of cavities.

7. The vehicle floor structure according to claim 6, further comprising a battery support frame configured to support the battery pack so that the battery pack is held in the cavity.

8. The vehicle floor structure according to claim 7, wherein the battery support frame includes a plurality of battery-side transversal members extending in a width direction of the battery pack.

9. The vehicle floor structure according to claim 8, wherein at least one battery-side transversal member among the plurality of battery-side transversal members is aligned with and connected to a tank-side transversal member among the plurality of tank-side transversal members along the width direction of the vehicle.

10. The vehicle floor structure according to claim 9, wherein the at least one battery-side transversal member and the at least one tank-side transversal member are connected to one of the pair of lower longitudinal members by a fastener.

11. The vehicle floor structure according to claim 5, further comprising a third lower crossmember disposed in at least one cavity of the pair of cavities, wherein the third lower crossmember extends in the width direction of the vehicle.

12. The vehicle floor structure according to claim 11, further comprising at least one battery-side transversal member, wherein the at least one battery-side transversal member and at least one tank-side transversal member among the plurality of tank-side transversal members are aligned with and connected to the third lower crossmember along the width direction of the vehicle.

13. The vehicle floor structure according to claim 5, further comprising:

a battery pack mounted in a first cavity of the pair of cavities; and an electronic component device mounted in a second cavity of the pair of cavities.

14. The vehicle floor structure according to claim 5, further comprising a pair of battery packs mounted in the pair of cavities, respectively.

15. A vehicle comprising:

a vehicle body;

a center floor panel disposed at a bottom of the vehicle body;

a rear floor panel disposed at the bottom the vehicle body and behind the center floor panel in a front-to-back direction of the vehicle body;

a tunnel extending along a central longitudinal axis of the center floor panel, and having a tunnel cavity;

a hydrogen tank located in the tunnel cavity of the tunnel;

a tank support frame configured to support the hydrogen tank so that the hydrogen tank is held in the tunnel cavity; and a pair of lower longitudinal members attached to a bottom surface of the center floor panel, and disposed on both edges of the tunnel, respectively, wherein the tank support frame includes a plurality of tank-side transversal members extending in a width direction of the hydrogen tank, and a tank-side longitudinal member extending in a longitudinal direction of the hydrogen tank, and wherein the plurality of tank-side transversal members extend in a width direction of the tunnel to connect the pair of lower longitudinal members.

16. The vehicle according to claim 15, further comprising:

a pair of first lower crossmembers attached to a bottom surface of the center floor panel, being symmetrical to each other with respect to the tunnel, and being adjacent to a front of the tunnel; and a pair of second lower crossmembers attached to the bottom surface of the center floor panel, being symmetrical to each other with respect to the tunnel, and being adjacent to a rear of the tunnel.

17. The vehicle according to claim 16, wherein at least one tank-side transversal member among the plurality of tank-side transversal members is aligned with and connected to the pair of first lower crossmembers along a width direction of the vehicle.

18. The vehicle according to claim 16, further comprising:

a pair of first seat crossmembers attached to a top surface of the center floor panel; and a pair of second seat crossmembers attached to the top surface of the center floor panel, and located behind the pair of first seat crossmembers, wherein the pair of first lower crossmembers are vertically aligned with the pair of first seat crossmembers.

* * * * *

UNITED STATES PATENT AND TRADEMARK OFFICE
CERTIFICATE OF CORRECTION

| | |
|---|---|
| PATENT NO. | : 11,661,114 B2 |
| APPLICATION NO. | : 17/217804 |
| DATED | : May 30, 2023 |
| INVENTOR(S) | : Ji Ho Choi |

It is certified that error appears in the above-identified patent and that said Letters Patent is hereby corrected as shown below:

On the Title Page

Item (73) Assignees; delete "Cornoration" and insert --Corporation--.

Signed and Sealed this
Fourth Day of July, 2023

Katherine Kelly Vidal
*Director of the United States Patent and Trademark Office*